Aug. 31, 1926.  
E. G. LIVESAY  
WHEEL PULLER  
Filed Feb. 26, 1926  
1,597,909  
2 Sheets-Sheet 2

INVENTOR  
EVERETT G. LIVESAY  
BY  
ATTORNEY

Patented Aug. 31, 1926.

1,597,909

UNITED STATES PATENT OFFICE.

EVERETT GREY LIVESAY, OF DAYTON, OHIO.

WHEEL PULLER.

Application filed February 26, 1926. Serial No. 90,902.

This invention relates to wheel pullers, and more particularly to pullers adapted to remove a wheel from an axle when the wheel is retained on the axle by means of a tapered spline.

An object of the invention is to provide a straddling member in the form of a bridge having an arm or arms adapted to be secured to the spline and having additional arms arranged at right angles thereto and passing through a portion of the spline to permit relative longitudinal movement of the spline and the last mentioned arms and prevent rotation of the spline.

A further object of the invention is the provision of improved means for actuating one set of the arms to cause relative longitudinal movement.

Figure 1:
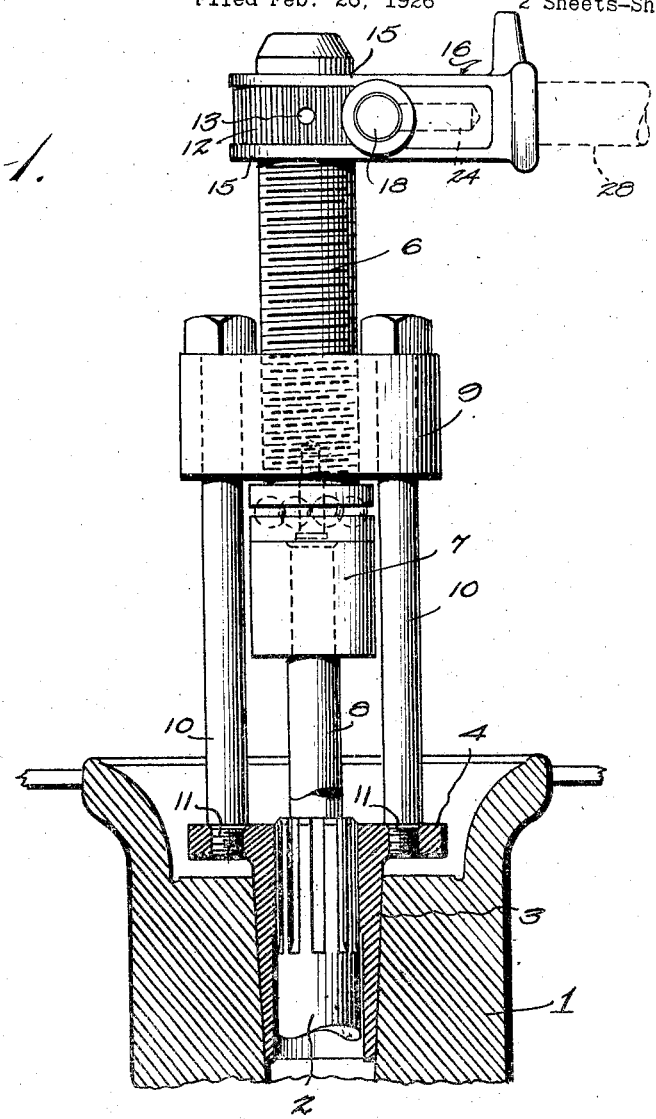
Figures 2, 3:
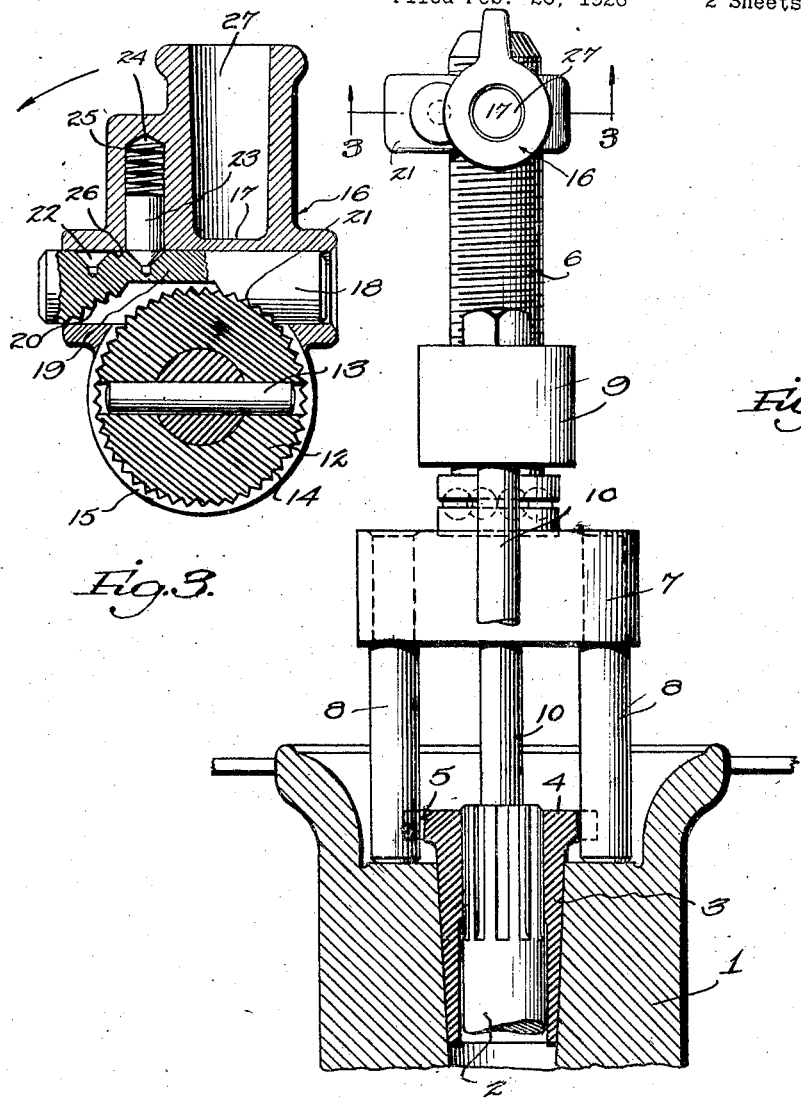

In the accompanying drawings I have shown one embodiment of the invention. In this showing, Figure 1 is a sectional view of a wheel and hub showing the wheel puller in position, the spokes of the wheel not being shown, Figure 2 is a similar view at right angles thereto, and, Figure 3 is a detail sectional view of the actuating mechanism taken on line 3—3 of Figure 2.

Referring to the drawings the reference numeral 1 designates the hub of a wheel which is mounted on an axle 2 and retained in position by means of a tapered spline 3. The spline is provided with an annular flange 4 on its outer end having a pair of diametrically opposed slots 5 and having threaded openings arranged intermediate the slots. The parts heretofore described are of the usual construction and form no part of the invention except in the combination claimed.

The wheel puller forming the subject matter of the present invention consists of a threaded shaft 6 having a head 7 mounted on its lower end. A pair of arms 8 are arranged on opposite sides of this head and are adapted to extend through the slots 5 as shown in Figure 1. Above the head 7 I provide a similar head 9 arranged at right angles thereto as shown in Figures 1 and 2 of the drawings and this head is provided with a threaded opening for the reception of the shaft 6. This head is also provided with a pair of depending arms 10 arranged at right angles to the arms 8 and extending downwardly on opposite sides of the head 7 (see Figure 1). The lower ends of these arms are threaded as at 11 and are adapted to be received in the threaded openings in the flange of the spline. At the upper end of the threaded rod I provide suitable actuating mechanism consisting of a ratchet wheel 12 which is secured to the shaft by means of a pin 13 and is provided with ratchet teeth 14 on its periphery. A yoke 15 is arranged over the ratchet wheel and this yoke is provided with an extension 16. As shown the extension is provided with a bore 17 adapted to receive a pin 18. The intermediate portion of the pin is reduced in width as at 19 and is provided with oppositely arranged inclined teeth 20 and 21 between the narrow portion of the pin and the wider end portions by means of which the shaft 9 may be operated in either direction. On the rear face of the pin there is provided a pair of recesses or notches 22 adapted to receive a locking member 23 which is arranged in a recess 24 of the member 16 and is normally projected by a spring 25. This face of the pin may also be provided with an intermediate notch 26 forming a neutral position for the pin. The member 16 may also be provided with a recess 27 for the reception of a handle 28 shown in dotted lines in Figure 1 of the drawings.

The operation of the device will be apparent from the foregoing description. The shaft is adapted to be actuated in either direction by properly setting the pin 18. This pin may be moved to reverse the actuating mechanism by applying pressure to the end of the pin to manually overcome the force of the spring 25 and remove it from one of the notches 26. When the locking pin is properly set and the yoke 16 revolved the head 9 moves longitudinally of the shaft 6. Rotation of the head is prevented due to the fact that the lower ends of the arms 10 are anchored in the spline and the stationary arms 8 passing through the slots 5 prevent rotation of the spline. As the arms 8 bear against the hub the movement of the head 9 toward the upper or outer end of the shaft 6 causes a force to be applied to the spline in one direction and to the hub in the opposite direction which withdraws the spline from the hub and then permits ready removal of the wheel from the axle.

It is to be understood that the form of the invention herewith shown and described is to be taken as a preferred example of the same and that various changes in the shape, size, and arrangement of parts may be resorted to without departing from the spirit of the invention or the scope of the subjoined claims.

I claim:

1. A wheel puller comprising a pair of heads, a pair of arms carried by each of said heads and arranged in planes at right angles to each other, and means for moving one of said heads longitudinally with respect to the other, the arms of one pair being provided with means for securing them to the work.

2. A wheel puller comprising a threaded shaft, a head arranged on the lower end of said shaft, a depending arm mounted on each end of said head, a second head having a threaded opening for the reception of said shaft, a pair of arms carried by said second head and arranged in a plane at right angles to said first pair of arms, means for rotating said shaft, and means for preventing rotation of said second head, each arm of said second named pair being provided with means for securing them to the work.

3. A wheel puller comprising a threaded shaft, a head arranged on the lower end of said shaft, a depending arm mounted on each end of said head, a second head having a threaded opening for the reception of said shaft, a pair of depending arms carried by said second head and arranged in a plane at right angles to said first pair of arms, the lower ends of one of said pairs of arms being provided with threaded portions, and means for rotating said shaft.

4. A wheel puller comprising a threaded shaft, a head arranged on the lower end of said shaft, a depending arm mounted on each end of said head, a second head having a threaded opening for the reception of said shaft, a pair of depending arms carried by said second head and arranged in a plane at right angles to said first pair of arms, means for rotating said shaft in either direction, and means for preventing rotation of said second head, each arm of said second named pair being provided with means for securing them to the work.

5. A device constructed in accordance with claim 2 wherein said rotating means consists of a ratchet wheel carried by said shaft, a yoke pivotally mounted on said shaft and a pin carried by said yoke and adapted to engage said ratchet wheel.

In testimony whereof I affix my signature.

EVERETT GREY LIVESAY.